US011271513B2

(12) United States Patent
Takagi et al.

(10) Patent No.: US 11,271,513 B2
(45) Date of Patent: Mar. 8, 2022

(54) DRIVING DEVICE, DRIVING SYSTEM, AND METHOD OF DRIVING ELECTRIC MOTOR

(71) Applicants: KABUSHIKI KAISHA TOSHIBA, Tokyo (JP); Toshiba Electronic Devices & Storage Corporation, Tokyo (JP)

(72) Inventors: Takashi Takagi, Kawasaki (JP); Toshimitsu Aizawa, Yokohama (JP); Shen Wang, Yokohama (JP)

(73) Assignees: KABUSHIKI KAISHA TOSHIBA, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/188,178

(22) Filed: Mar. 1, 2021

(65) Prior Publication Data

US 2021/0281205 A1   Sep. 9, 2021

(30) Foreign Application Priority Data

Mar. 3, 2020   (JP) .............................. JP2020-035879

(51) Int. Cl.
*H02P 21/00*     (2016.01)
*H02P 27/08*     (2006.01)
(Continued)

(52) U.S. Cl.
CPC ........ *H02P 27/08* (2013.01); *H02M 7/53871* (2013.01); *H02P 21/14* (2013.01); *H02P 21/22* (2016.02)

(58) Field of Classification Search
CPC .......... H02P 27/08; H02P 21/22; H02P 21/14; H02M 7/53871
(Continued)

(56) References Cited

U.S. PATENT DOCUMENTS 9,602,035 B2 *   3/2017   Tsukakoshi ............... H02P 6/18
10,637,381 B2 *  4/2020   Shigeta .................... H02P 21/22
(Continued)

FOREIGN PATENT DOCUMENTS

JP    2009-240042 A    10/2009
JP    2010-268613 A    11/2010
(Continued)

*Primary Examiner* — Erick D Glass
(74) *Attorney, Agent, or Firm* — Oblon, McClelland, Maier & Neustadt, L.L.P.

(57) ABSTRACT

A driving device of one embodiment includes a phase estimator and a voltage controller. The phase estimator estimates a phase of stator interlinkage magnetic flux of an electric motor based on a current flowing through the electric motor, a voltage command of a drive voltage applied to the electric motor, and a winding resistance value of the electric motor. The voltage controller acquires a first voltage vector component in a direction in which the stator interlinkage magnetic flux acts and a second voltage vector component in a direction which is orthogonal to the direction in which the stator interlinkage magnetic flux acts for the voltage command of the drive voltage, and sets the voltage command of the drive voltage based on the first voltage vector component and the second voltage vector component.

8 Claims, 4 Drawing Sheets

(51) Int. Cl.
*H02P 21/22* (2016.01)
*H02P 21/14* (2016.01)
*H02M 7/5387* (2007.01)

(58) Field of Classification Search
USPC .................................................. 318/400.02
See application file for complete search history.

(56) References Cited

U.S. PATENT DOCUMENTS

2018/0191283 A1   7/2018  Aoyagi et al.
2020/0106378 A1*  4/2020  Xu .......................... H02P 21/20

FOREIGN PATENT DOCUMENTS

| JP | 2017-17909 A | 1/2017 |
| JP | 2019-154143 A | 9/2019 |
| WO | WO 2019/064749 A1 | 4/2019 |

* cited by examiner

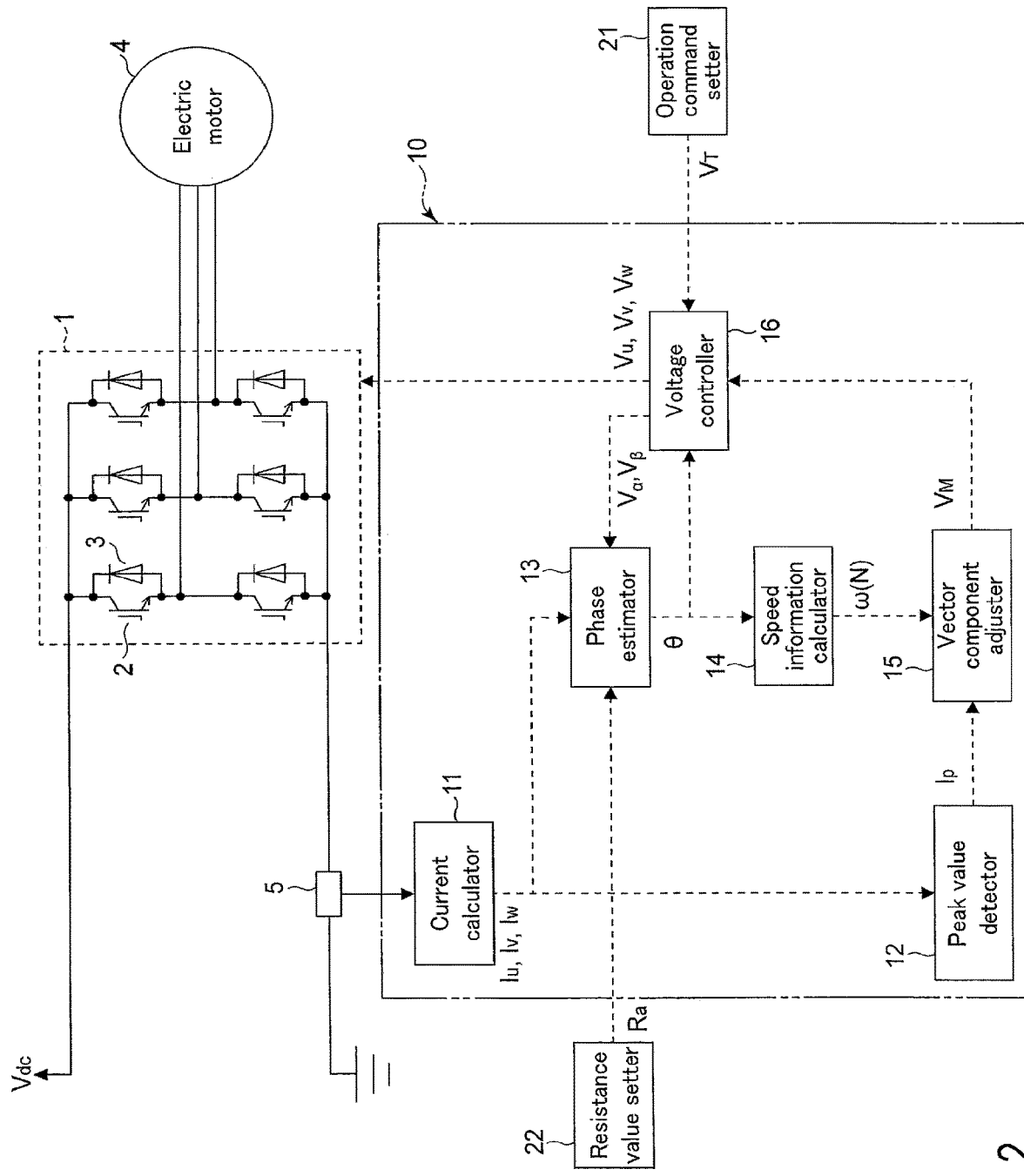
F I G. 2

US 11,271,513 B2

DRIVING DEVICE, DRIVING SYSTEM, AND METHOD OF DRIVING ELECTRIC MOTOR

CROSS-REFERENCE TO RELATED APPLICATION

This application is based upon and claims the benefit of priority from Japanese Patent Application No. 2020-035879, filed Mar. 3, 2020, the entire contents of which are incorporated herein by reference.

FIELD

An embodiment described herein relates generally to a driving device, a driving system, and a method of driving an electric motor.

BACKGROUND

In a driving system of an electric motor, upon receipt of power, an electric power converter (inverter) converts the power into AC power and supplies the AC power to an electric motor. Then, a driving device controls the operation of the electric power converter to control a drive voltage to be applied to the electric motor. In such a driving system, from the viewpoint of cost reduction, a driving device may control the drive voltage of an electric motor by a sensorless method in which no sensor to detect the position (phase) of a rotor of the electric motor is provided. Also, from the viewpoint of cost reduction, it is required, for example, to form a driving device from not a microcomputer but an integrated circuit (IC) which is more inexpensive than the microcomputer. The processing capacity of the integrated circuit is smaller than that of a microcomputer or the like. To form a driving device from an integrated circuit, therefore, it is required that the driving device use the sensorless method to control a drive voltage through a relatively simple process.

BRIEF DESCRIPTION OF THE DRAWINGS

FIG. 2 is a block diagram schematically showing an example of a driving device and a driving system according to a first embodiment.

DETAILED DESCRIPTION

According to an embodiment, a driving device includes a phase estimator and a voltage controller. The phase estimator estimates a phase of stator interlinkage magnetic flux of an electric motor based on a current flowing through the electric motor, a voltage command of a drive voltage applied to the electric motor, and a winding resistance value of the electric motor. The voltage controller acquires a first voltage vector component in a direction in which the stator interlinkage magnetic flux acts and a second voltage vector component in a direction which is orthogonal to the direction in which the stator interlinkage magnetic flux acts for the voltage command of the drive voltage, and sets the voltage command of the drive voltage based on the first voltage vector component and the second voltage vector component. The voltage controller controls an operation of an electric power converter, which converts input electric power into AC power having an optional voltage and frequency and supplies the AC power to the electric motor, based on the set voltage command to control the drive voltage to be applied to the electric motor.

An embodiment will be described below with reference to the drawings.

First Embodiment

Figure 1:
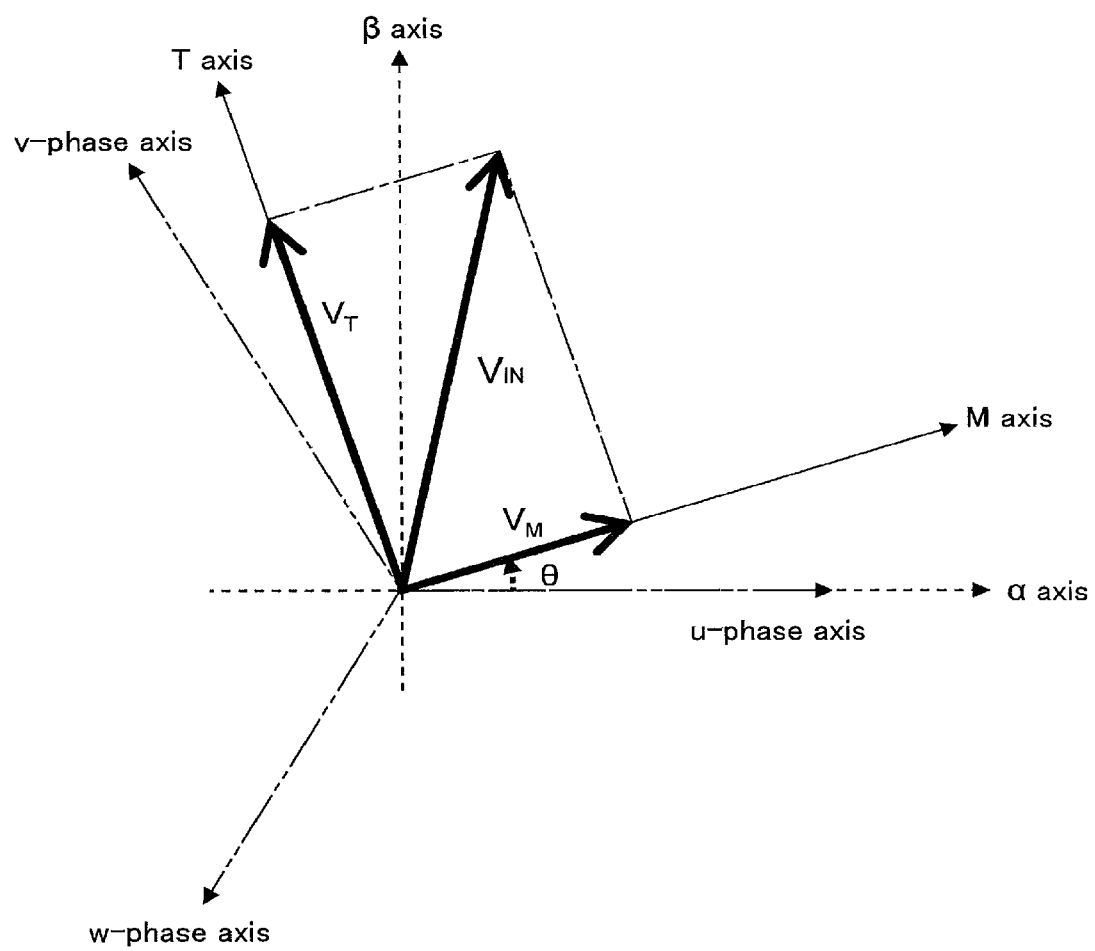
FIG. 1 is a schematic diagram showing an example of a vector diagram in an electric motor.

First is a description of parameters related to the drive control of an electric motor of embodiments, that is, the control of a drive voltage applied to the electric motor. FIG. 1 is a vector diagram in an electric motor using a permanent magnet. FIG. 1 is also a vector diagram in a three-phase synchronous electric motor to which three-phase AC electric power is applied. Three-phase AC voltages of a u-phase drive voltage, a v-phase drive voltage and a w-phase drive voltage whose phases are different from one another, are applied to the three-phase synchronous electric motor as drive voltages. The phase of the u-phase drive voltage is shifted by 120° from the phase of each of the v-phase drive voltage and the w-phase drive voltage, and the phase of the v-phase drive voltage is shifted by 120° from the phase of the w-phase drive voltage. Therefore, as shown in FIG. 1, a u-phase axis, a v-phase axis and a w-phase axis are defined in the three-phase synchronous electric motor. The angle between the u-phase axis and the v-phase axis, the angle between the v-phase axis and the w-phase axis and the angle between the w-phase axis and the u-phase axis are each 120°.

In an electric motor such as the three-phase synchronous electric motor, an $\alpha$ axis and a $\beta$ axis orthogonal to the $\alpha$ axis are defined. In the three-phase synchronous electric motor, the $\alpha$ axis is defined to coincide with the u-phase axis. Under the control of the drive voltage of the electric motor to be described later, three-phase/two-phase conversion (three-phase/$\alpha\beta$ conversion) is performed to convert a voltage command of a three-phase (u phase, v phase and w phase) AC voltage into a voltage command of a two-phase AC voltage including an a-axis direction voltage component and a $\beta$-axis direction voltage component and convert a three-phase AC current into a two-phase AC current including an $\alpha$-axis direction current component and a $\beta$-axis direction current component. Furthermore, under the control of a drive voltage of the electric motor to be described later, two-phase/three-phase conversion ($\alpha\beta$/three-phase conversion) is performed to convert a voltage command of a two-phase AC voltage including an $\alpha$-axis direction voltage component and a $\beta$-axis direction voltage component into a voltage command of a three-phase (u phase, v phase and w phase) AC voltage.

In the electric motor, an M axis is defined as an axis along a direction in which stator interlinkage magnetic flux acts, and a T axis that is orthogonal to the M axis is defined. Under the control of the drive voltage of the electric motor to be described later, the phase difference between the M axis and the $\alpha$ axis is set as the phase $\theta$ of the stator interlinkage magnetic flux of the electric motor. For the voltage command of the drive voltage of the electric motor, a voltage vector component (first voltage vector component) $V_M$ in the direction in which the stator interlinkage magnetic flux acts and a voltage vector component (second voltage vector component) $V_T$ in a direction orthogonal to the direction in which the stator interlinkage magnetic flux acts are defined. FIG. 1 shows an example of the voltage vector components $V_M$ and $V_T$. FIG. 1 also shows a voltage command vector $V_{IN}$ of a drive voltage obtained by a composition of the voltage vector components $V_M$ and $V_T$. The voltage vector component $V_M$ is a voltage vector component in the M-axis direction of the voltage command vector $V_{IN}$ of the drive voltage, and the voltage vector component $V_T$ is a voltage vector component in the T-axis direction of the voltage command vector $V_{IN}$ of the drive voltage.

Below are descriptions of a driving device that drives and controls an electric motor by controlling a drive voltage applied to the electric motor, and a driving system including the driving device and the electric motor. FIG. 2 shows an example of a driving device and a driving system according to the first embodiment. The driving system includes an electric motor 4 and a driving device that drives and controls the electric motor 4. In the example of FIG. 2, the electric motor 4 is a three-phase synchronous electric motor.

The driving system includes an electric power converter 1. In the example of FIG. 2, the electric power converter 1 includes, for example, six insulated gate bipolar transistors (IGBTs) 2 as switching elements. In the electric power converter 1, a so-called inverter circuit is configured by three-phase bridge connection of the six IGBTs 2. In each of the IGBTs 2, a reflux diode 3 is connected between the collector and the emitter. Each reflux diode 3 is connected in parallel to its corresponding one of the IGBTs 2. The electric power converter 1 is supplied with DC power from a DC power source $V_{dc}$ serving as a driving electric power source. Each of three output terminals (three-phase output terminals) of the electric power converter 1 is connected to its corresponding one of three stator windings (three-phase stator windings) of the electric motor 4.

The driving device includes a current calculator 11, a peak value detector 12, a phase estimator 13, a velocity information calculator 14, a vector component adjuster 15 and a voltage controller 16. In the example shown in FIG. 2, the current calculator 11, peak value detector 12, phase estimator 13, velocity information calculator 14, vector component adjuster 15 and voltage controller 16 are implemented on an integrated circuit (IC) 10. It is preferable in the present embodiment that the IC 10 be configured by hardware only. Note that the IC 10 may include a processor, a storage medium (non-transitory storage medium) and the like, and the IC 10 including a processor may execute a program or the like stored in the storage medium or the like to perform a process to be described later. In this case, the processor includes a central processing unit (CPU), an application specific integrated circuit (ASIC), a field programmable gate array (FPGA), or the like.

As one example, the driving device may be configured by the IC 10 on which at least the phase estimator 13 and the voltage controller 16 are implemented, and any one of the current calculator 11, peak value detector 12, velocity information calculator 14 and vector component adjuster 15 may be implemented on, for example, a microcomputer or an integrated circuit other than the IC 10 of the driving device. As another example, any one of the electric power converter 1 described above and a current detector 5, an operation command setter 21 and a resistance value setter 22 to be described later may be implemented further thereon. As still another example, the phase estimator 13, the voltage controller 16 and the like may be implemented on not the IC 10 but a microcomputer or the like on which one or more integrated circuits are implemented.

The voltage controller 16 transmits a command to the electric power converter 1 to cause the electric power converter 1 to supply AC power to the electric motor 4. In response to the command from the voltage controller 16, the electric power converter 1 converts the power supplied from the DC power source $V_{dc}$ into three-phase AC power having an optional voltage and frequency. The electric power converter 1 supplies the converted three-phase AC power to the electric motor 4. The electric power converter 1 thus outputs, for example, a pseudo-sine wave three-phase AC voltage. The output three-phase AC voltage is applied to the electric motor 4 as a drive voltage. The foregoing u-phase drive voltage, v-phase drive voltage and w-phase drive voltage are each applied to the electric motor 4. For example, when a drive voltage is applied to the electric motor 4, the rotor of the electric motor 4 rotates to drive the electric motor 4. The voltage controller 16 controls the operation of the electric power converter 1 to control the drive voltage and control the driving (rotation) of the electric motor 4.

The voltage controller 16 sets a voltage command of the drive voltage as will be described later. Then, the voltage controller 16 sets a voltage command value Vu of the u-phase drive voltage, a voltage command value $V_v$ of the v-phase drive voltage and a voltage command value $V_w$ of the w-phase drive voltage. The voltage controller 16 controls the operation of the electric power converter 1 based on the voltage command set for the drive voltage. In response to the set voltage command, for example, the voltage controller 16 generates a command on the on/off timing of each of the IGBTs 2 serving as switching elements. The voltage controller 16 then generates a pulse signal pattern to control the on/off timing of each of the IGBTs 2. As the pulse signal to control the on/off timing of each of the IGBTs 2, there is a three-phase pulse width modulation (PWM) signal, for example. The three-phase PWM signal is generated by comparing the voltage command values $V_u$, $V_v$ and $V_w$ of the drive voltage with carrier waves such as triangular waves. The voltage controller 16 controls the on/off timing of each of the IGBTs 2 based on the generated pulse signal pattern, and controls the drive voltage to be applied to the electric motor 4, that is, the three-phase AC voltage.

The driving system includes the current detector 5. The current calculator 11 of the driving device calculates u-phase current $I_u$, v-phase current $I_v$ and w-phase current $I_w$, which flow through the electric motor 4, based on the result of detection of the current detector 5. In the example of FIG. 2, the current detector 5 includes a single shunt resistor disposed in a power supply line on the negative side (ground side) of the electric power converter 1, and the current detector 5 and current calculator 11 detect currents $I_u$, $I_v$ and $I_w$ in a one-shunt method. As one example, a shunt resistor may be disposed between the emitter of each of the three IGBTs 2 on the negative side (ground side) and the power supply line on the negative side in the electric power converter 1. In this case, the currents $I_u$, $I_v$ and $I_w$ are detected by a three-shunt method in which three shunt resistors are disposed. As another example, the currents $I_u$, $I_v$ and $I_w$ may be detected using a current sensor or the like.

The current calculator 11 transmits information about the currents $I_u$, $I_v$ and $I_w$ flowing through the electric motor 4 to the peak value detector 12. The peak value detector 12 includes a peak hold circuit. The peak value detector 12 detects the peak value of the current $I_u$ in one cycle as a peak value $I_p$. The peak value detector 12 detects the peak value $I_p$ for each cycle. The peak value detector 12 can identify the start and end of one cycle of the current $I_u$ by various methods. For example, the peak value detector 12 may detect a zero crossing at which the current (alternating current) $I_u$ is changed from positive to negative or a zero crossing at which the current $I_u$ is changed from negative to positive from the information about the currents $I_u$, $I_v$ and $I_w$ to identify the start and end of one cycle of the current $I_u$. In addition, the peak value detector 12 may identify the start and end of one cycle of the current $I_v$ and detect the peak value of the current $I_v$ as the peak value $I_p$, instead of identifying the start and end of one cycle of the current $I_u$. The peak value detector 12 may also identify the start and end of one cycle of the current $I_w$ and detect the peak value of the current $I_w$ as a peak value $I_p$, instead of identifying the start and end of one cycle of one the currents $I_u$ and $I_v$.

The phase estimator 13 receives information about the currents $I_u$, $I_v$ and $I_w$ flowing through the electric motor 4 from the current calculator 11, and also receives information about real-time voltage command values $V_u$, $V_v$ and $V_w$ of the drive voltage of the electric motor 4 from the voltage controller 16. The driving system also includes the resistance value setter 22. As one example, the resistance value setter 22 includes a user interface, and a user and the like set information about a winding resistance value Ra for each phase of the electric motor 4. As another example, the resistance value setter 22 includes a storage medium to store information about the winding resistance value Ra for each phase of the electric motor 4. The phase estimator 13 receives information about the winding resistance value Ra of the electric motor 4 from the resistance value setter 22. In the present embodiment, the three phases (u phase, v phase and w phase) have winding resistance values Ra which coincide with each other. The phase estimator 13 estimates and calculates the phase θ of the stator interlinkage magnetic flux of the electric motor 4, as will be described later, based on the currents $I_u$, $I_v$ and $I_w$, the voltage command values $V_u$, $V_v$ and $V_w$ of the drive voltages, and the winding resistance value Ra. That is, the phase estimator 13 estimates a phase difference between the M axis and the α axis.

The velocity information calculator 14 receives information regarding the phase θ of the stator interlinkage magnetic flux of the electric motor 4 from the phase estimator 13. Based on the information regarding the phase θ of the stator interlinkage magnetic flux, the velocity information calculator 14 calculates the rotational angular velocity (rotational velocity) ω of the rotor of the electric motor 4 as velocity information of the electric motor 4. As one example, the velocity information calculator 14 sets a reference phase for the phase θ of the stator interlinkage magnetic flux. Then, the velocity information calculator 14 detects time elapsed until the phase θ of the stator interlinkage magnetic flux changes from the reference phase to the next reference phase. The velocity information calculator 14 calculates the rotational angular velocity ω of the electric motor 4 based on the detected elapsed time.

The vector component adjuster 15 receives velocity information including the rotational angular velocity ω of the electric motor 4 from the velocity information calculator 14, and also receives the foregoing peak value $I_p$ of the current (corresponding one of $I_u$, $I_v$ and $I_w$) flowing through the electric motor 4 from the peak value detector 12. The vector component adjuster 15 sets an index E using the rotational angular velocity ω and the peak value $I_p$. In the present embodiment, the ratio of the peak value $I_p$ of the current (corresponding one of $I_u$, $I_v$ and $I_w$) to the rotational angular velocity ω is set as the index ε. As described above, regarding the voltage command of drive voltage of the electric motor 4, a voltage vector component (first voltage vector component) $V_M$ is defined in a direction in which the stator interlinkage magnetic flux acts. Based on the index E, the vector component adjuster 15 adjusts the magnitude of the voltage vector component $V_M$ of the voltage command of the drive voltage. As will be described later, the vector component adjuster 15 adjusts the magnitude of the voltage vector component $V_M$ of the voltage command of the drive voltage so as to decrease the index ε.

The voltage controller 16 receives information regarding the phase θ of the stator interlinkage magnetic flux of the electric motor 4 from the phase estimator 13 and also receives information regarding the voltage vector component $V_M$ from the vector component adjuster 15. The driving system includes the operation command setter 21. The operation command setter 21 includes, for example, a user interface, and, for example, a user sets a command for the operation of the electric motor 4. As one example, a common user interface may be used in the operation command setter 21 and the resistance value setter 22. The operation command setter 21 may be provided with a touch panel, an operation button, a remote controller, or the like as the user interface.

As a command for the operation set by the operation command setter 21, there is, for example, a velocity command for the rotational velocity of the electric motor 4. As described above, regarding the voltage command of the drive voltage of the electric motor 4, a voltage vector component (second voltage vector component) $V_T$ is defined in a direction orthogonal to the direction in which the stator interlinkage magnetic flux acts. The operation command setter 21 sets the magnitude of the voltage vector component $V_T$ of the voltage command of the drive voltage to a magnitude corresponding to the velocity command for the rotational velocity. Then, the operation command setter 21 transmits information about the voltage vector component $V_T$ to the voltage controller 16. As one example, the operation command setter 21 may transmit the velocity command for the rotational velocity to the voltage controller 16. In this case, the voltage controller 16 sets the magnitude of the voltage vector component $V_T$ of the voltage command of the drive voltage to a magnitude corresponding to the velocity command for the rotational velocity.

Based on the phase θ of the stator interlinkage magnetic flux, the voltage controller 16 defines the directions of the voltage vector components $V_M$ and $V_T$. Based on the voltage vector components $V_M$ and $V_T$, the voltage controller 16 sets voltage command values $V_u$, $V_v$, and $V_w$ of the drive voltage and sets a voltage command for the drive voltage, as will be described later. Based on the voltage command set for the drive voltage, the voltage controller 16 generates a pattern of pulse signals for controlling the on/off timing of each of the IGBTs 2. In the pulse signals for controlling the on/off timing of each of the IGBTs 2, the duty ratio varies in response to the magnitude of the voltage vector component (second voltage vector component) $V_T$ of the voltage command of the drive voltage. Furthermore, as shown in FIG. 1, etc., the phase of the voltage command vector $V_{IN}$ of the drive voltage varies in response to the magnitude of the voltage vector component (first voltage vector component) $V_M$ of the voltage command of the drive voltage. In the pulse signals for controlling the on/off timing of each of the IGBTs 2, the phase is corrected in accordance with the magnitude of the voltage vector component (first voltage vector component) $V_M$ of the voltage command of the drive voltage.

Figure 3:
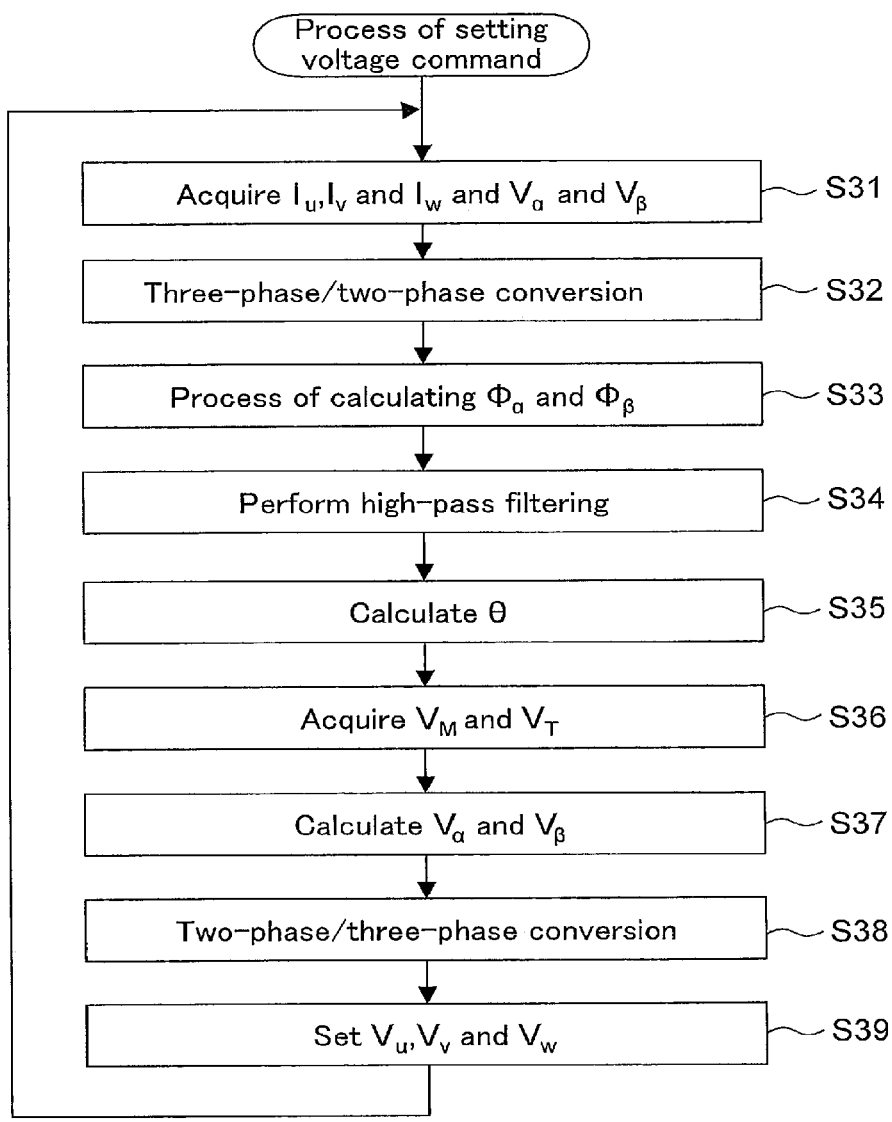
FIG. 3 is a flowchart showing a process of setting a voltage command of a drive voltage of the electric motor, which is performed by a phase estimator, a voltage controller and the like in the driving device according to the first embodiment.

FIG. 3 is a flowchart showing a process of setting a voltage command of a drive voltage of the electric motor 4, which is performed by the phase estimator 13, the voltage controller 16 and the like in the driving device. The process shown in FIG. 3 is continued while the electric motor 4 is driven. As shown in FIG. 3, in the process of setting a voltage command of the drive voltage, the phase estimator 13 acquires currents $I_u$, $I_v$ and $I_w$ flowing through the electric motor 4 as a result of calculation in the current calculator 11 (step S31). The phase estimator 13 also acquires a real-time voltage component $V\alpha$ in the $\alpha$-axis direction and a real-time voltage component $V\beta$ in the S-axis direction from the voltage controller 16 in regard to the voltage command of the drive voltage (step S31). The voltage controller 16 performs the process in step S37 to be described later to calculate voltage components $V\alpha$ and $V\beta$. Then, the phase estimator 13 uses the equation (1) to perform three-phase/two-phase conversion (three-phase/$\alpha\beta$ conversion) of the currents $I_u$, $I_v$ and $I_w$ (step S32). Thus, the current component $I_\alpha$ in the $\alpha$-axis direction and the current component $I_\beta$ in the $\beta$-axis direction are calculated in regard to the currents flowing through the electric motor 4.

$$\begin{pmatrix} I_\alpha \\ I_\beta \end{pmatrix} = \begin{pmatrix} 1 & -1/2 & -1/2 \\ 0 & \sqrt{3}/2 & \sqrt{3}/2 \end{pmatrix} \begin{pmatrix} I_u \\ I_v \\ I_w \end{pmatrix} \quad (1)$$

Calculating the current components $I_\alpha$ and $I_\beta$ and the voltage components $V_\alpha$ and $V_\beta$, the phase estimator 13 acquires a winding resistance value Ra per phase of the electric motor 4 from the resistance value setter 22. Based on the current components $I_\alpha$ and $I_\beta$, voltage components $V_\alpha$ and $V_\beta$ and winding resistance value Ra, the phase estimator 13 performs a process of calculating an $\alpha$-axis direction magnetic flux component $\Phi_\alpha$ and a $\beta$-axis direction magnetic flux component $\Phi_\beta$ in regard to the stator interlinkage magnetic flux of the electric motor 4 (step S33). The process of calculating the magnetic flux component $\Phi_\alpha$ is performed by integration represented by the following expression (2), and the process of calculating the magnetic flux component $\Phi_\beta$ is also performed by integration represented by the following expression (3).

$$\begin{cases} \Phi_\alpha = \int (V_\alpha - R_a I_\alpha) dt & (2) \\ \Phi_\beta = \int (V_\beta - R_a I_\beta) dt & (3) \end{cases}$$

Then, the phase estimator 13 performs high-pass filtering for the result of the integration in each of the equations (2) and (3) (step S34). With the high-pass filtering, a DC component of the stator interlinkage magnetic flux is eliminated from the result of the integration in each of the equations (2) and (3). Accordingly, integration constants, i.e., the initial values of the magnetic flux components $\Phi_\alpha$ and $\Phi_\beta$ at the time in which t is equal to 0, are deleted from the result of the integration in each of the equations (2) and (3). The high-pass filtering is described in detail in Jpn. Pat. Appln. KOKAI Publication No. 2009-240042.

Then, the phase estimator 13 calculates and estimates the phase $\theta$ of the stator interlinkage magnetic flux using the high-pass filtered magnetic flux components $\Phi_\alpha$ and $\Phi_\beta$ (step S35). The phase $\theta$ of the stator interlinkage magnetic flux is calculated using the following equation (4). In the present embodiment, a difference in phase between the M axis and the $\alpha$ axis is calculated as the phase $\theta$ of the stator interlinkage magnetic flux. As described above, the phase estimator 13 estimates the phase $\theta$ of the stator interlinkage magnetic flux of the motor 4 based on the currents $I_u$, $I_v$ and $I_w$ flowing through the electric motor 4, the voltage commands (voltage command values $V_u$, $V_v$, and $V_w$) of the drive voltage applied to the electric motor 4, and the winding resistance value $R_a$.

$$\theta = \arctan\left(\frac{\Phi_\beta}{\Phi_\alpha}\right) \quad (4)$$

The voltage controller 16 acquires the phase $\theta$ of the stator interlinkage magnetic flux from the phase estimator 13. For the voltage command of a drive voltage to be set, the voltage controller 16 also acquires a voltage vector component (first voltage vector component) $V_M$ in the M-axis direction from the vector component adjuster 15 and a voltage vector component (second voltage vector component) $V_T$ in the T-axis direction from the operation command setter 21 (step S36). The voltage controller 16 defines the directions of the voltage vector components $V_M$ and $V_T$, namely the M-axis and T-axis directions, based on the phase $\theta$ of the stator interlinkage magnetic flux. In addition, the voltage controller 16 acquires a voltage vector component $V_M$ whose magnitude is adjusted by the vector component adjuster 15 as will be described later. Then, the voltage controller 16 acquires a voltage vector component $V_T$ whose magnitude is set to correspond to the velocity command.

Using the acquired voltage vector components, the voltage controller 16 calculates an $\alpha$-axis direction voltage component $V\alpha$ and a $\beta$-axis direction voltage component $V_\beta$ for the voltage command of a drive voltage to be set (step S37). These voltage components $V_\alpha$ and $V_\beta$ are calculated using the equation (5) indicated below. The voltage controller 16 performs two-phase/three-phase conversion ($\alpha\beta$/three-phase conversion) for the voltage components $V_\alpha$ and $V_\beta$ using the equation (6) indicated below (step S38). The voltage controller 16 sets the results of the calculation in step S38 as voltage command values $V_u$, $V_v$ and $V_w$ of the drive voltage. The voltage controller 16 thus sets a voltage command value $V_u$ of the u-phase drive voltage, a voltage command value $V_v$ of the v-phase drive voltage and a voltage command value $V_w$ of the w-phase drive voltage.

$$\begin{pmatrix} V_\alpha \\ V_\beta \end{pmatrix} = \begin{pmatrix} \cos\theta & -\sin\theta \\ \sin\theta & \cos\theta \end{pmatrix} \begin{pmatrix} V_M \\ V_T \end{pmatrix} \quad (5)$$

$$\begin{pmatrix} V_u \\ V_v \\ V_w \end{pmatrix} = \begin{pmatrix} 1 & 0 \\ -1/2 & \sqrt{3}/2 \\ -1/2 & -\sqrt{3}/2 \end{pmatrix} \begin{pmatrix} V_\alpha \\ V_\beta \end{pmatrix} \quad (6)$$

As described above, for the voltage command of the drive voltage of the electric motor 4, the voltage controller 16 acquires a voltage vector component (first voltage vector component) $V_M$ in a direction (M-axis direction) in which the stator interlinkage magnetic flux acts and a voltage vector component (second voltage vector component) $V_T$ in a direction (T-axis direction) which is orthogonal to the direction in which the stator interlinkage magnetic flux acts. Then, the voltage controller 16 sets a voltage command of the drive voltage based on the voltage vector components $V_M$ and $V_T$. The voltage controller 16 controls the operation of the power converter 1 based on the set voltage command to control the drive voltage to be applied to the electric motor 4.

Figure 4:
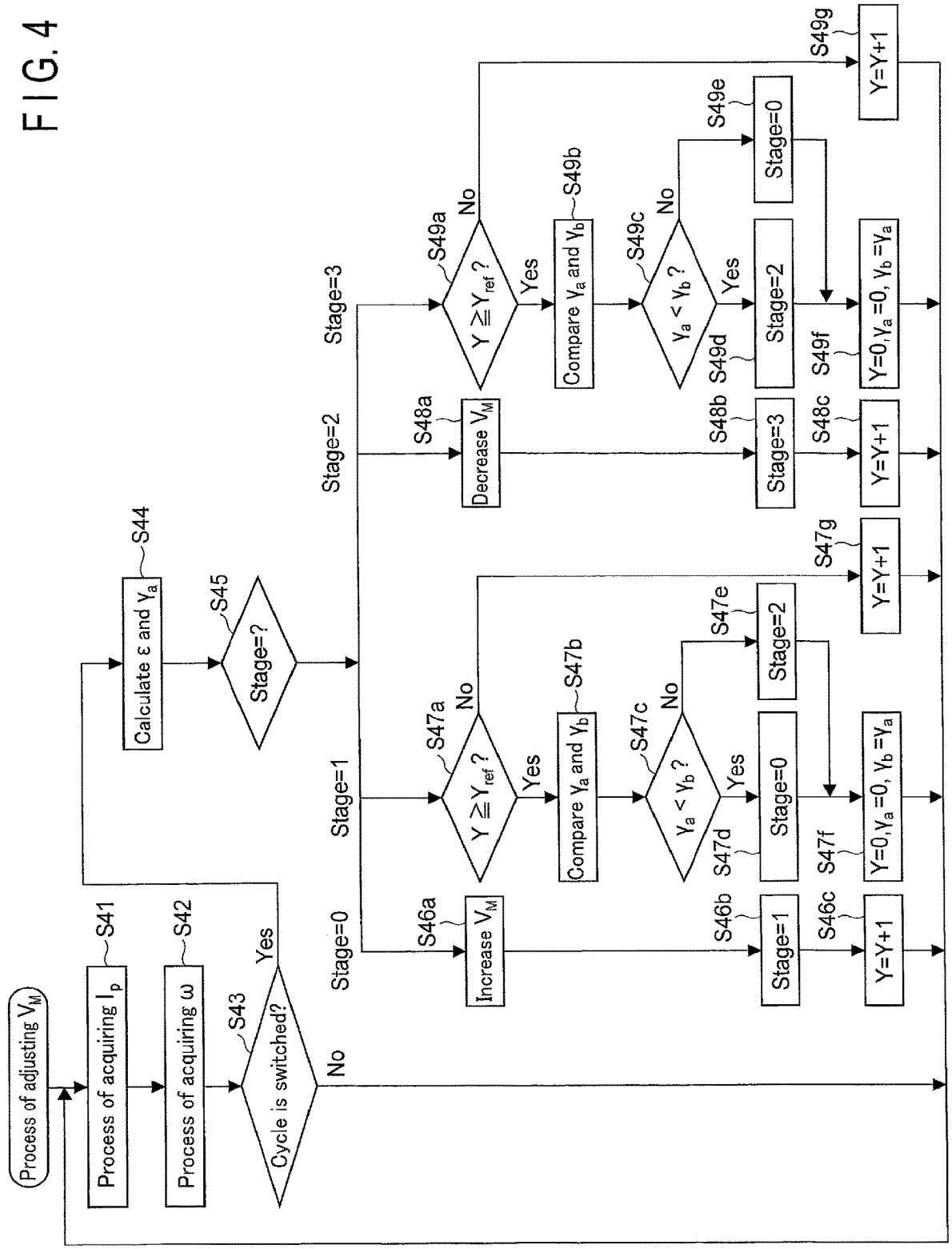
FIG. 4 is a flowchart showing a process of adjusting a voltage vector component (first voltage vector component) of the voltage command of the drive voltage, which is performed by a vector component adjuster and the like in the driving device according to the first embodiment.

FIG. 4 is a flowchart showing a process of adjusting the voltage vector component (first voltage vector component) $V_M$ of the voltage command of the drive voltage, which is performed by the vector component adjuster 15 and the like in the driving device. The process shown in FIG. 4 is continued while the electric motor 4 is driven. As shown in FIG. 4, the vector component adjuster 15 performs the process of acquiring the foregoing peak value $I_p$ of the current (corresponding one of $I_u$, $I_v$ and $I_w$) flowing through the electric motor 4, based on, for example, the detection result of the peak value detector 12 (step S41). The vector component adjuster 15 also performs the process of acquiring the rotational angular velocity (rotational velocity) $\omega$ of the electric motor 4 based on, for example, the calculation result of the velocity information calculator 14 (step S42). Based on, for example, the identification results of the start and end of one cycle of the current (corresponding one of $I_u$, $I_v$ and $I_w$) in the peak value detector 12 and the like, the vector component adjuster 15 determines whether the current (corresponding one of $I_u$, $I_v$ and $I_w$), which is an alternating current, is switched in the next cycle (step S43). That is, in step S43, the vector component adjuster 15 determines whether one cycle of the current (corresponding one of $I_u$, $I_v$ and $I_w$) has ended.

If the current (corresponding one of $I_u$, $I_v$ and $I_w$) is not switched in the next cycle (No in step S43), the process stands by without proceeding to step S44, and continues the processes of steps S41 to S43. Through the processes of steps S41 to S43, the vector component adjuster 15 acquires the peak value $I_p$ of the current (corresponding one of $I_u$, $I_v$ and $I_w$) and the rotational angular velocity $\omega$ of the electric motor 4 once for each cycle of the current (corresponding one of $I_u$, $I_v$ and $I_w$). If the current (corresponding one of $I_u$, $I_v$ and $I_w$) is switched in the next cycle (Yes in step S43), the process proceeds to step S44, and the processes after step S44 are performed in sequence. The processes after step S44 are performed every time the cycle of the current (corresponding one of $I_u$, $I_v$ and $I_w$) is switched, and are performed for each cycle of the current (corresponding one of $I_u$, $I_v$ and $I_w$).

Then, the vector component adjuster 15 calculates the ratio of the peak value $I_p$ of the current (corresponding one of $I_u$, $I_v$ and $I_w$) to the rotational angular velocity $\omega$ as an index E (step S44). The vector component adjuster 15 also calculates an integrated value $\gamma_a$ of the index e (step S44). The integrated value $\gamma_a$ is reset to zero for each $Y_{ref}$ cycle of the current (corresponding one of $I_u$, $I_v$ and $I_w$) by the process of step S47f or S49f to be described later. Here, $Y_{ref}$ is a natural number of two or more. The integrated value $\gamma_a$ is thus reset to zero for every two or more cycles of the current (corresponding one of $I_u$, $I_v$ and $I_w$). The n-th cycle integrated value $\gamma_a(n)$ is expressed by the following equation (7). The equation (7) represents the peak value $I_p$ and rotational angular velocity $\omega$ acquired in the n-th cycle, the index $\varepsilon_{(n)}$ in the n-th cycle, and the integrated value $\gamma_a(n-1)$ in the (n−1)-th cycle.

$$\gamma_{a(n)} = \gamma_{a(n-1)} + \varepsilon_{(n)} = \gamma_{a(n-1)} + \frac{I_p}{\omega} \quad (7)$$

The vector component adjuster 15 determines which stage corresponds to the adjustment status of the magnitude of the voltage vector component $V_M$ (step S45). The stage includes, for example, four statuses of 0, 1, 2 and 3. In the first determination in step S45, the stage is determined to be 0, for example. If the stage indicating the adjustment status is 0 (stage=0 in step S45), the vector component adjuster 15 increases the magnitude of the voltage vector component $V_M$ (step S46a). Then, the vector component adjuster 15 sets the stage indicating the adjustment status of the magnitude of the voltage vector component $V_M$ to 1 (step S46b). In addition, the vector component adjuster 15 adds a count value Y by one (step S46c). The count value Y indicates how many cycles of the current (corresponding one of $I_u$, $I_v$ and $I_w$) have passed since the last comparison using the integrated value $\gamma_a$ in the process of step S47b or S49b to be described later. The count value Y is reset to zero for each $Y_{ref}$ cycle of the current (corresponding one of $I_u$, $I_v$ and $I_w$) through the process of step S47f or S49f to be described later, and is reset to zero in the same cycle as that in which the integrated value $\gamma_a$ is reset to zero. The process thus returns to step S41, and the processes after step S41 are performed in sequence.

If the stage indicating the adjustment status is 1 (stage=1 in step S45), the vector component adjuster 15 determines whether the count value Y is equal to or larger than the reference value $Y_{ref}$ (step S47a). The reference value $Y_{ref}$ corresponds to a value indicating how many cycles for every which the integrated value $\gamma_a$ is reset to zero by the process of step S47f or S49f to be described later. The reference value $Y_{ref}$ also corresponds to a value indicating how many cycles for every which the comparison using the integrated value $\gamma_a$ through the process of step S47b or S49b to be described later is performed. In step S47a, therefore, the vector component adjuster 15 determines whether the cycles of the current (corresponding one of $I_u$, $I_v$ and $I_w$) have exceeds the $Y_{ref}$ cycle since the last comparison using the integrated value $\gamma_a$ in the process of step S47b or S49b to be described later. When the count value Y is smaller than the reference value $Y_{ref}$ (No in step S47a), the vector component adjuster 15 adds the count value Y by one (step S47g). In addition, the vector component adjuster 15 maintains the stage indicating the adjustment status of the magnitude of the voltage vector component $V_M$ at 1. Then, the process returns to step S41, and the processes after step S41 are performed in sequence.

On the other hand, when the count value Y is equal to or larger than the reference value $Y_{ref}$ (Yes in step S47a), that is, when $Y_{ref}$ cycles or more of the current (corresponding one of $I_u$, $I_v$ and $I_w$) have passed since the last comparison using the integrated value $\gamma_a$, the vector component adjuster 15 compares the integrated values $\gamma_a$ and γb (step S47b). In the step of comparison such as step S47b, the integrated value $\gamma_a$ corresponds to the integrated value of the index c from the last comparison to the current comparison through the process of step S47b or step S49b to be described later. The integrated value γb corresponds to the integrated value of the index E from the two times before comparison to the last comparison through the process of step S47b or step S49b to be described later. The integrated value γb thus corresponds to the value used as the integrated value $\gamma_a$ in the last comparison. As a result of the comparison of the integrated values $\gamma_a$ and γb in step S47b, the vector component adjuster 15 determines whether the current integrated value $\gamma_a$ is smaller than the last integrated value γb (step S47c).

When the integrated value $\gamma_a$ is smaller than the integrated value γb (Yes in step S47c), the vector component adjuster 15 sets the stage indicating the adjustment status to 0 (step S47d). On the other hand, when the integrated value $\gamma_a$ is equal to or larger than the integrated value γb (No in step S47c), the vector component adjuster 15 sets the stage indicating the adjustment status to 2 (step S47e). When the process of step S47d or S47e is performed, the vector component adjuster 15 resets the count value Y and the integrated value $\gamma_a$ to zero, and updates the integrated value γb to the value used as the current integrated value $\gamma_a$ in the comparison in step S47b (step S47f). When the integrated values $\gamma_a$ and γb are compared in step S47b, the count value Y and the integrated value $\gamma_a$ are reset to zero and the integrated value γb is updated to the value used as the integrated value $\gamma_a$ in step S47b through the process of step S47f in the same cycle as the cycle in which the comparison is performed. Then, the process returns to step S41, and the processes after step S41 are performed in sequence.

When the stage indicating the adjustment status of the magnitude of the voltage vector component $V_M$ is 2 (stage=2 in step S45), the vector component adjuster 15 decreases the magnitude of the voltage vector component $V_M$ (step S48a). The vector component adjuster 15 sets the stage indicating the adjustment status to 3 (step S48b). The vector component adjuster 15 adds the count value Y by 1 (step S48c). Then, the process returns to step S41, and the processes after step S41 are performed in sequence.

When the stage indicating the adjustment status of the magnitude of the voltage vector component $V_M$ is 3 (stage=3 in step S45), the vector component adjuster 15 determines whether the count value Y is equal to or larger than the reference value $Y_{ref}$ (step S49a). When the count value Y is smaller than the reference value $Y_{ref}$ (No in step S49a), the vector component adjuster 15 adds the count value Y by 1 (step S49g). The vector component adjuster 15 maintains the stage indicating the adjustment status at 3. Then, the process returns to step 41, and the processes after step S41 are performed in sequence.

On the other hand, when the count value Y is equal to or larger than the reference value $Y_{ref}$ (Yes in step S49a), that is, when $Y_{ref}$ cycles or more of the current (corresponding one of $I_u$, $I_v$ and $I_w$) have passed since the last comparison using the integrated value $\gamma_a$, the vector component adjuster 15 compares the integrated values $\gamma_a$ and γb (step S49b) as in the process of step S47b. As a result of the comparison of the integrated values $\gamma_a$ and γb in step S49b, the vector component adjuster 15 determines whether the current integrated value $\gamma_a$ is smaller than the last integrated value γb (step S49c).

When the integrated value $\gamma_a$ is smaller than the integrated value γb (Yes in step S49c), the vector component adjuster 15 sets the stage indicating the adjustment status of the magnitude of the voltage vector component $V_M$ to 2 (step S49d). On the other hand, when the integrated value $\gamma_a$ is equal to or larger than the integrated value γb (No in step S49c), the vector component adjuster 15 sets the stage indicating the adjustment status to 0 (step S49e). When the process of step S49d or S49e is performed, the vector component adjuster 15 resets the count value Y and the integrated value $\gamma_a$ to zero, and updates the integrated value γb to the value used as the current integrated value $\gamma_a$ in the comparison in step S49b (step S49f). When the integrated values $\gamma_a$ and γb are compared in step S49b, the count value Y and the integrated value $\gamma_a$ are reset to zero and the integrated value γb is updated to the value used as the integrated value $\gamma_a$ in step S49b through the process of step S49f in the same cycle as the cycle in which the comparison is performed. Then, the process returns to step S41, and the processes after step S41 are performed in sequence.

The above-described processes are performed by the vector component adjuster 15. If, therefore, the current integrated value $\gamma_a$ becomes smaller than the last integrated value γb as a result of increasing the magnitude of the voltage vector component $V_M$, the process of increasing the magnitude of the voltage vector component $V_M$ is continued. On the other hand, if the current integrated value $\gamma_a$ becomes equal to or larger than the last integrated value γb as a result of increasing the magnitude of the voltage vector component $V_M$, the process is switched to a process of decreasing the magnitude of the voltage vector component $V_M$. If the current integrated value $\gamma_a$ becomes smaller than the last integrated value γb as a result of decreasing the magnitude of the voltage vector component $V_M$, the process of decreasing the magnitude of the voltage vector component $V_M$ is continued. On the other hand, when the current integrated value $\gamma_a$ becomes equal to or larger than the last integrated value γb as a result of decreasing the magnitude of the voltage vector component $V_M$, the process is switched to a process of increasing the magnitude of the voltage vector component $V_M$.

In the present embodiment, therefore, the magnitude of the voltage vector component $V_M$ is adjusted such that the integrated value $\gamma_a$ of the index e for the $Y_{ref}$ cycles of the current (corresponding one of $I_u$, $I_v$ and $I_w$) becomes small (minimum), and it is adjusted such that the index E becomes small. In addition, the phase of the voltage command vector $V_{IN}$ of the drive voltage obtained by the composition of the voltage vector components $V_M$ and $V_T$ varies in response to the magnitude of the voltage vector component $V_M$. In the present embodiment, therefore, the magnitude of the voltage vector component $V_M$ is adjusted and accordingly the phase of the voltage command vector $V_{IN}$ of the drive voltage is adjusted such that the index s becomes small.

As described above, in the present embodiment, the phase estimator 13 estimates the phase θ of the stator interlinkage magnetic flux of the electric motor 4 based on the currents $I_u$, $I_v$, and $I_w$ flowing through the electric motor 4, the voltage command (voltage command values $V_u$, $V_v$ and $V_w$) of the drive voltage applied to the electric motor 4, and the winding resistance value $R_a$. The voltage controller 16 sets a voltage command of the drive voltage based on the voltage vector component (first voltage vector component) $V_M$ in a direction (M-axis direction) in which the stator interlinkage magnetic flux acts and a voltage vector component (second voltage vector component) $V_T$ in a direction (T-axis direction) which is orthogonal to the direction in which the stator interlinkage magnetic flux acts. In the present embodiment, therefore, the voltage command of the drive voltage of the electric motor 4 is set, and the drive voltage of the electric motor 4 is controlled without detecting or estimating the position (phase) of the rotor of the electric motor 4. The drive voltage of the electric motor 4 is thus controlled by the sensorless method in which no sensor is provided to detect the position of the rotor of the electric motor 4. Accordingly, the driving device and the driving system can be decreased in cost.

For example, when the position of the rotor of the electric motor 4 is estimated by the sensorless method, the phase of an induced voltage of each of three phases (u phase, v phase and w phase) needs to be detected in the electric motor 4. To do so, a detection circuit to detect the induced voltage of each of the three phases needs to be provided. In addition, a complicated process is required to detect the induced voltage of each of the three phases and estimate the position of the rotor based on the detected induced voltage. In the present embodiment, as described above, the voltage command of the drive voltage of the electric motor 4 is set using the phase θ of the stator interlinkage magnetic flux in place of the position of the rotor. For this reason, the position (phase) of the rotor of the electric motor 4 or the like need not be estimated, and the phase of the induced voltage of each of the three phases need not be detected. Therefore, the voltage command of the drive voltage of the electric motor 4 is set and the drive voltage of the electric motor 4 is controlled without complicating the process, namely by a relatively simple process.

As described above, in the present embodiment, the drive voltage of the electric motor 4 is controlled by the sensorless method and by the relatively simple process. The driving device, which controls the drive of the electric motor 4, such as controlling the drive voltage, can thus be implemented on an integrated circuit (IC) whose throughput is lower than that of a microcomputer and the like. The integrated circuit is less expensive than a microcomputer and the like. Thus, the driving device and the driving system can be further decreased in cost by implementing the driving device on the integrated circuit.

In the present embodiment, furthermore, the process of calculating the magnetic flux components $\Phi_\alpha$ and $\Phi_\beta$ of the stator interlinkage magnetic flux is performed by integration, and a high-pass filtering is performed as a result of the integration. With the high-pass filtering, from a result of the integration, the DC component of the stator interlinkage magnetic flux is deleted and the initial values of the magnetic flux components $\Phi_\alpha$ and $\Phi_\beta$ at the time in which t is equal to 0 are deleted. In order to set the initial values of the magnetic flux components $\Phi_\alpha$ and $\Phi_\beta$, it is necessary to grasp the position of the rotor of the electric motor 4 and the like. In the present embodiment, the initial values of the magnetic flux components $\Phi_\alpha$ and $\Phi_\beta$ are deleted by the high-pass filtering from a result of the integration. It is thus unnecessary to perform a process of setting the initial values of the magnetic flux components $\Phi_\alpha$ and $\Phi_\beta$. This simplifies the process of estimating the phase θ of the stator interlinkage magnetic flux and further simplifies the process of setting the voltage command of the drive voltage.

In the present embodiment, as described above, the magnitude of the voltage vector component $V_M$ of the voltage command of the drive voltage is adjusted appropriately such that the index c becomes small (minimum). As the index c becomes small, a phase difference between the induced voltage vector of the electric motor 4 and the current vector (composition vector of $I_u$, $I_v$ and $I_w$) flowing through the electric motor 4 converges to zero. Because the phase difference of the current vector flowing through the electric motor 4 relative to the induced voltage vector converges to zero, the electric motor 4 is improved in its efficiency. In the present embodiment, because the magnitude of the voltage vector component $V_M$ of the voltage command of the drive voltage is adjusted such that the index c becomes small (minimum), the high efficiency of the electric motor 4 is achieved even under condition that neither torque control nor velocity control is performed, that is, under condition that the output torque varies.

In the present embodiment, the integrated value $\gamma_a$ of the index s for the $Y_{ref}$ cycles of the current (corresponding one of $I_u$, $I_v$ and $I_w$) is acquired and compared with the last integrated value γb. This comparison is performed for each $Y_{ref}$ cycles of the current (corresponding one of $I_u$, $I_v$ and $I_w$). The actual operation of the device is thus performed with stability.

In the present embodiment, the index a corresponds to the ratio of the peak value $I_p$ of the current (corresponding one of $I_u$, $I_v$ and $I_w$) to the rotational angular velocity (rotational velocity) ω, and is calculated without using the output torque of the electric motor 4. The efficiency of the electric motor 4 can thus be improved even though no output torque can be obtained.

(Modifications)

As one modification, the velocity information calculator 14 calculates a parameter corresponding to time that is the reciprocal of the rotational angular velocity (rotational speed) ω as velocity information of the electric motor 4. In this modification, the velocity information calculator 14 calculates the count value N as a parameter corresponding to time that is the reciprocal of the rotational angular velocity ω. The reciprocal of the rotational angular velocity ω corresponds to time required to move the rotor of the electric motor 4 in an optional section. The count value N is represented by the following equation (8) using the rotation angular velocity ω and a fixed control processing interval X. The index c used in the first embodiment and the like, that is, the ratio of the peak value $I_p$ of the current (corresponding one of $I_u$, $I_v$ and $I_w$) to the rotational angular velocity ω can be modified as the equation (9) below.

$$N \cong \frac{2\pi}{X} \cdot \frac{1}{\omega} \qquad (8)$$

$$\varepsilon = \frac{I_p}{\omega} = \frac{X}{2\pi} \cdot I_p \cdot N \propto I_p \cdot N \qquad (9)$$

Therefore, the index ε used in the first embodiment and the like can be calculated using the count value N in place of the rotational angular velocity ω. In the present modification, the vector component adjuster 15 acquires the count value N as a parameter corresponding to time that is the reciprocal of the rotational angular velocity ω, and calculates the index F using the count value N and the peak value $I_p$ of the current (corresponding one of $I_u$, $I_v$ and $I_w$) in place of the rotational angular velocity ω. The index c is calculated using a value obtained by multiplying the peak value $I_p$ by the count value N.

Since the index E is calculated as described above in the present modification, division need not be performed in the calculation of the index ε. General division requires more arithmetic operations than addition, subtraction, multiplication and the like, and complicates the configuration of the arithmetic circuit. Since no division is performed to calculate the index ε, the number of arithmetic operations in the driving device can be decreased, and the configuration of the arithmetic circuit can be simplified. In the present modification, the electric motor 4 can thus be improved in its efficiency by a simpler process than in the above-described embodiments and the like.

In the foregoing embodiment and the like, the electric power converter 1 applies three-phase AC power to the electric motor 4, but the foregoing drive control can be applied to a case where one-phase AC power is applied to the electric motor 4 and a case where two-phase AC power is applied to the electric motor 4. Similarly, the foregoing drive control can also be applied to a case where AC power of four or more phases is applied to the electric motor 4.

According to at least one of the embodiments and examples, the driving device includes a phase estimator and a voltage controller. The phase estimator estimates the phase of stator interlinkage magnetic flux of the electric motor based on the current flowing through the electric motor, the voltage command of a drive voltage applied to the electric motor, and the winding resistance value of the electric motor. The voltage controller sets the voltage command of the drive voltage based on a first voltage vector component in a direction in which the stator interlinkage magnetic flux acts and a second voltage vector component in a direction orthogonal to the direction in which the stator interlinkage magnetic flux acts. Thus, the driving device can control the drive voltage of the electric motor by the sensorless method and by a relatively simple process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A driving device comprising:
   a phase estimator estimating a phase of stator interlinkage magnetic flux of an electric motor based on a current flowing through the electric motor, a voltage command of a drive voltage applied to the electric motor, and a winding resistance value of the electric motor; and
   a voltage controller acquiring a first voltage vector component in a direction in which the stator interlinkage magnetic flux acts and a second voltage vector component in a direction which is orthogonal to the direction in which the stator interlinkage magnetic flux acts for the voltage command of the drive voltage, and setting the voltage command of the drive voltage based on the first voltage vector component and the second voltage vector component, the voltage controller controlling an operation of an electric power converter, which converts input electric power into AC power having an optional voltage and frequency and supplies the AC power to the electric motor, based on the set voltage command to control the drive voltage to be applied to the electric motor.

2. The driving device of claim 1, further comprising:
   a velocity information calculator calculating, as velocity information, at least one of a rotational velocity of the electric motor and a parameter related to the rotational velocity based on the phase of the stator interlinkage magnetic flux of the electric motor, which is estimated by the phase estimator; and
   a vector component adjuster adjusting magnitude of the first voltage vector of the voltage command of the drive voltage so as to decrease an index calculated based on the current flowing through the electric motor and the velocity information calculated by the velocity information calculator.

3. The driving device of claim 2, wherein
   the velocity information calculator calculates the rotational velocity of the electric motor as the velocity information, and
   the vector component adjuster sets a ratio of the current to the rotational velocity as the index.

4. The driving device of claim 2, wherein
   the velocity information calculator calculates a parameter corresponding to time that is a reciprocal of the rotational velocity as the velocity information, and
   the vector component adjuster sets the index using a value obtained by multiplying the parameter corresponding to the time by the current.

5. The driving device of claim 1, wherein the phase estimator performs a calculation by integration and performs high-pass filtering for a result of the calculation by the integration to calculate the stator interlinkage magnetic flux.

6. The driving device of claim 1, further comprising an integrated circuit on which at least the phase estimator and the voltage controller are implemented.

7. A driving system comprising:
   the driving device of claim 1;
   the electric power converter; and
   the electric motor to which the drive voltage is applied from the electric power converter.

8. A method of driving an electric motor, comprising:
   estimating a phase of stator interlinkage magnetic flux of the electric motor based on a current flowing through the electric motor, a voltage command of a drive voltage applied to the electric motor, and a winding resistance value of the electric motor;
   acquiring a first voltage vector component in a direction in which the stator interlinkage magnetic flux acts and a second voltage vector component in a direction which is orthogonal to the direction in which the stator interlinkage magnetic flux acts for the voltage command of the drive voltage;
   setting the voltage command of the drive voltage based on the first voltage vector component and the second voltage vector component; and
   controlling an operation of an electric power converter, which converts input electric power into AC power having an optional voltage and frequency and supplies the AC power to the electric motor, based on the set voltage command to control the drive voltage to be applied to the electric motor.

* * * * *